UNITED STATES PATENT OFFICE.

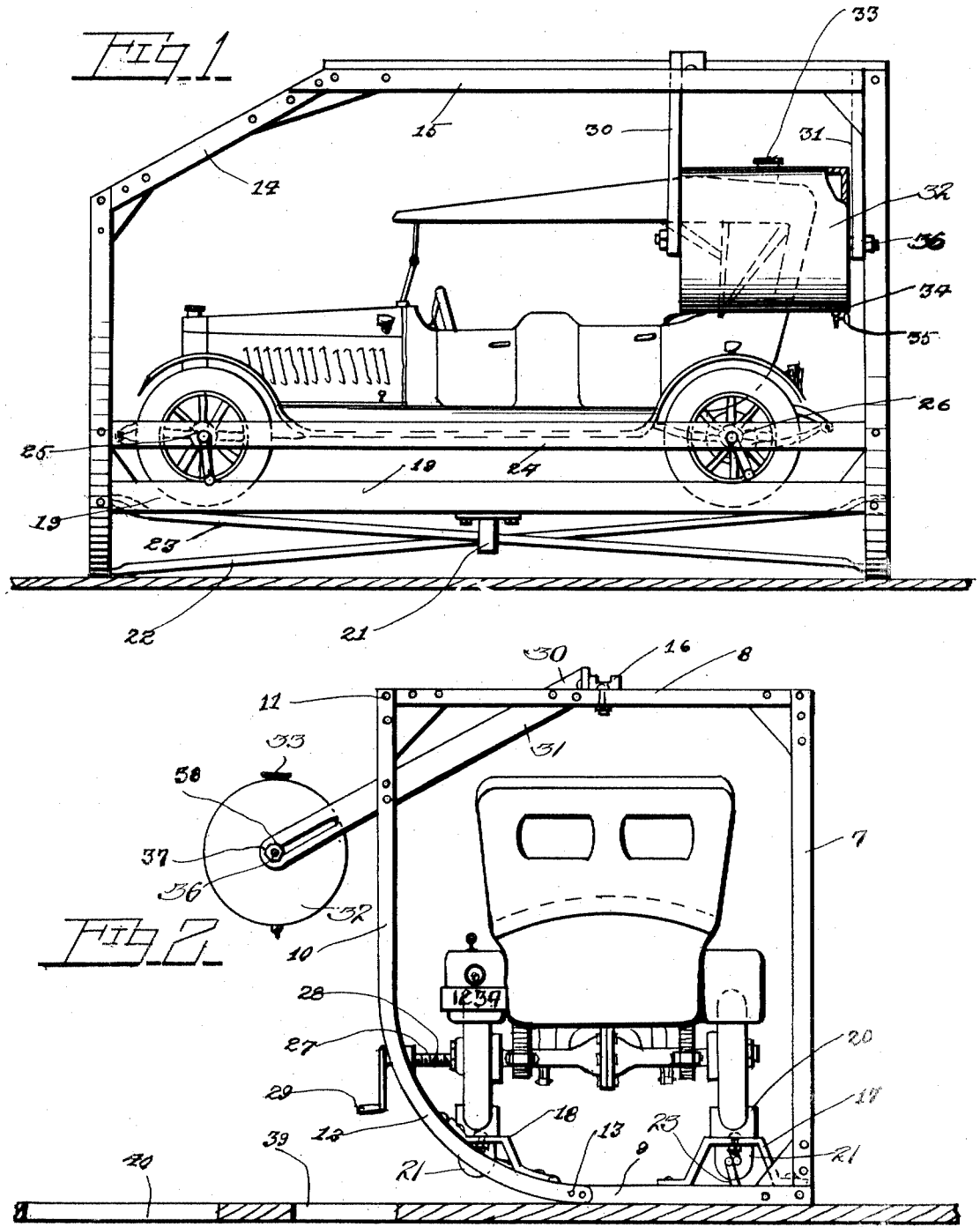

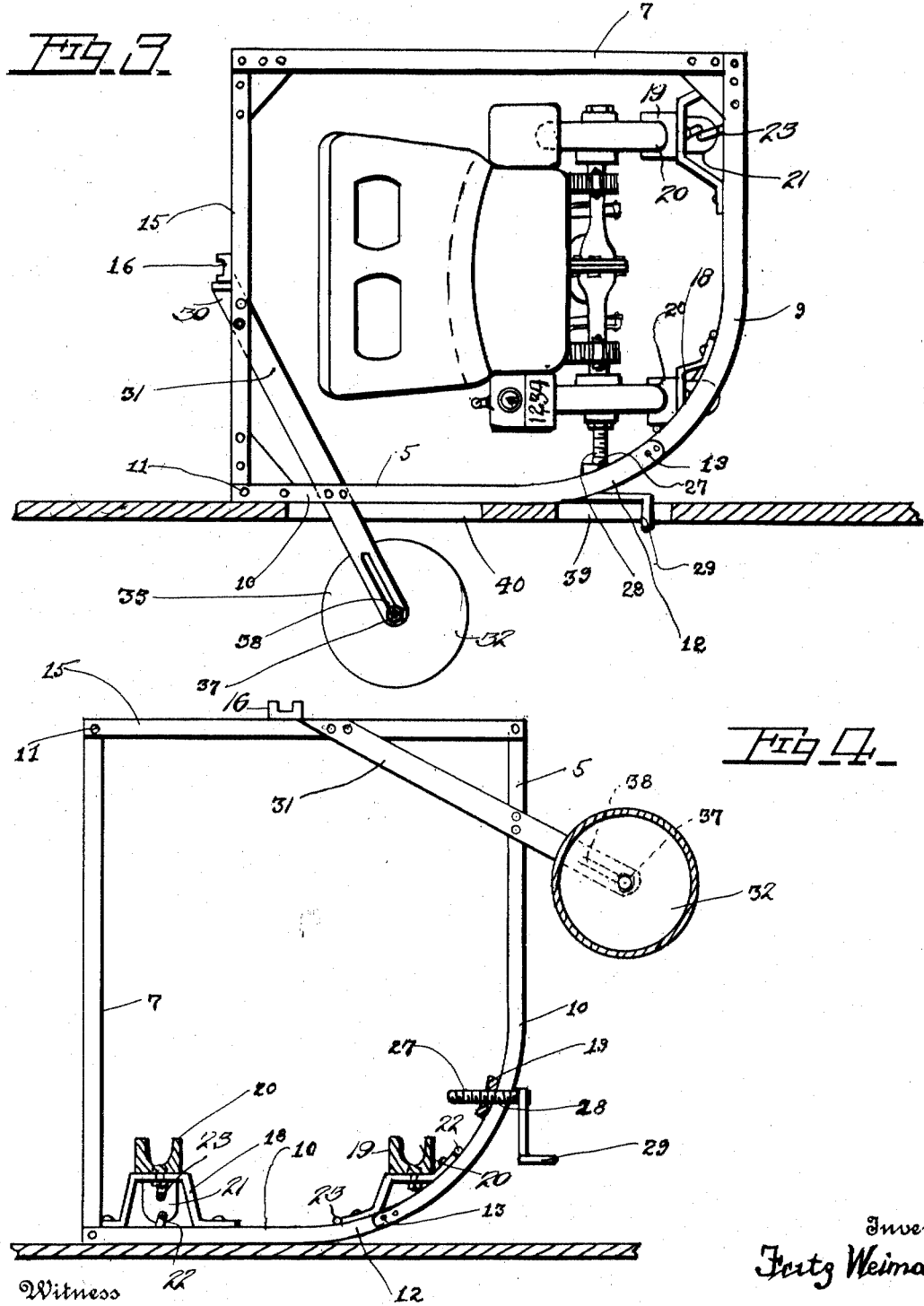

FRITZ WEIMAR, OF SAN ANTONIO, TEXAS, ASSIGNOR OF ONE-HALF TO LON E. MOUNGER, OF SAN ANTONIO, TEXAS.

AUTOMOBILE-TILTING MACHINE.

1,334,336.  Specification of Letters Patent.  Patented Mar. 23, 1920.

Application filed October 7, 1919. Serial No. 329,085.

*To all whom it may concern:*

Be it known that I, FRITZ WEIMAR, a citizen of the United States, residing at San Antonio, in the county of Bexar and State of Texas, have invented a new and useful Automobile-Tilting Machine, of which the following is a specification.

This invention relates to new and useful improvements in automobile jacks, and more particularly to jacks adapted to lift an automobile and tilt the same laterally, to enable a mechanic to have easy access to the under part of the automobile to facilitate crank case, and rear axle repair work.

The primary object of the invention is to provide means for securing the automobile undergoing repair, to the jack, to prevent movement of the automobile with relation to the jack, when the jack is being tilted.

A further object of the invention is to provide means including an adjustable weight, for over balancing the jack and assisting in the tilting of the jack laterally, to accomplish the desired result.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1 illustrates a side elevational view of a jack constructed in accordance with the present invention, showing an automobile positioned therein.

Fig. 2 is an end elevational view of the same.

Fig. 3 is an end elevational view of the jack, showing the same in its tilted position, and Fig. 4 is an end elevational view of the jack, showing the same before the automobile is positioned therein.

Having reference to the drawings in detail, the jack includes a frame which comprises end sections, each of said sections being constructed of the vertical side bars 7, top bars 8, lower bars 9, and side bars 10, the side bars 10 having their upper ends connected to the bars 8 as at 11, the lower ends thereof being curved as at 12, and having connection with the lower bars 9, as at 13.

The frame also includes the front upper bars 14, which extend from the side bars 15, downwardly, and have connection with the bars 6, and one of the rear bars 7 to give the frame strength, and at the same time to give the frame the general outline of an automobile.

A reinforcing bar 16, connects the top bars 8, to restrict, or prevent movement of the end sections 5 and 6, with relation to each other.

The bracket members 17 and 18, are connected to the lower bars 9, and support the relatively long track sections 19, which have their upper surfaces curved as at 20, to conform to the contour of an automobile tire.

Depending from the lower surface of each of the track sections 19, is a bracket 21, which is disposed substantially intermediate the lengths of the track sections, and accommodates the central portions of the brace rods 22 and 23, which cross each other at a point within the bracket 21, the ends thereof being supported in spaced relation to each other and secured to the end sections 5 and 6, to further add strength to the frame proper, and at the same time provide a rigid support for the central portion of the track sections 19.

Disposed in parallel relation with one of the track sections 19, is a bar 24, which has its respective ends connected to the end sections 5 and 6, the same being also provided with openings 25 and 26 formed therein adjacent the ends thereof, which openings, are threaded, to receive the threaded portions 27 of the clamping members 28, which are provided with operating handles 29 to enable the clamping members 28 to be rotated into close engagement with the hub of a vehicle, supported on the track, whereby lateral pressure is brought to bear on the wheel portions of the automobile, which lateral pressure forces the wheel sections into close engagement with the side walls of the track sections, with the result that the automobile is securely held against lateral displacement within the track sections 19.

Supported adjacent the upper portion of the frame, are the arms 30 and 31, the arm 31 having its upper end connected with one of the top bars 8, the intermediate portion thereof having connection with one of the bars 10, the arm 30, which is disposed in spaced relation with the arm 31, has its upper end connected to the bar 16, the lower end thereof extends downwardly and terminates at a point in the same plane with the lower end of the arm 31.

As shown, each of these bars 30 and 31, is provided with an elongated slot extending from a point adjacent the free end thereof, and terminating at a point a short distance from the free end, for purposes to be hereinafter more fully described.

A weight 32, which is in the form of a water chamber, is supported between the arms 30 and 31, and is provided with a central opening 33, to permit water to be placed within the chamber, the outlet opening 34, which is controlled by the valve 35, being for the purpose of permitting water to discharge from the chamber, to vary the weight, according to the weight of the machine to be tilted, by the jack.

A shaft 36, has connection with the weight 32, which shaft is supported in the elongated slots of the arms 30 and 31, the nuts 37, which operate on the threaded ends 38, of the shaft 36, clamping the weight in various positions throughout the elongated slots, whereby the weight 32, is adjusted to and from the frame proper.

It is of course understood that the floor which supports a jack constructed in accordance with the present invention, must be provided with suitable openings as indicated by 39 and 40, the opening 39, being for the purpose for providing a clearance for the operating handle 29, and the opening 40 providing a clearance for the weight 42, when the frame is in its tilted position.

In operation an automobile is positioned on the tracks of the machine, the tank 32 is now filled with a quantity of water sufficient to counterbalance the weight of the machine, when the machine is tilted.

The clamping members 28, are then rotated to force the automobile wheels against the sides of the track sections 19, whereupon the automobile is securely held within the track sections.

The weight 32, is now adjusted in such relation with the jack, or frame that the same will counterbalance the frame to tilt or rock on the curved portions 12 of the side bars 10, when slight pressure is brought to bear on the opposite side of the frame.

It is now apparent that the under construction of the automobile, is in full view of the operator, or mechanic, who is to work on the machine.

Having thus described the invention, what is claimed is:—

1. An automobile jack including a frame comprising side bars and top bars, said side bars having curved portions to permit the frame to rock, track sections supported within the frame, means for securing the automobile in the track sections, a pair of arms supported adjacent the upper portion of the frame, a tank supported by the arms, and means for permitting adjustment of the tank with relation to the arms, said tank adapted to contain fluid to counterbalance the frame when the same is tilted.

2. An automobile jack including a frame comprising side bars and top bars, said side bars having lower curved portions to permit the frame to tilt, means for connecting the side bars, a pair of angularly disposed arms supported by the upper portion of the frame, and having their lower ends extending beyond the vertical plane of the side bars of the frame, and an adjustable weight supported by the lower ends of the arms.

In testimony that I claim the foregoing as my own, I have hereto affixed my signature in the presence of two witnesses.

FRITZ WEIMAR.

Witnesses:
E. LeComte,
R. P. Ingram.